Dec. 10, 1968  J. A. WOLLER  3,415,032
EVACUATION PORT SEAL
Filed Aug. 12, 1965

INVENTOR.
JOHN A. WOLLER
BY G+McCoy
Wayland H. Riggins
ATTORNEYS

United States Patent Office 3,415,032
Patented Dec. 10, 1968

3,415,032
EVACUATION PORT SEAL
John A. Woller, Decatur, Ala., assignor to the United States of America as represented by the National Aeronautics and Space Administration
Filed Aug. 12, 1965, Ser. No. 479,353
1 Claim. (Cl. 53—22)

ABSTRACT OF THE DISCLOSURE

A method of evacuating a vacuum container and sealing the evacuation port of the container. A rigid evacuation tube is coated with lubricant and inserted into a relatively thin-walled flexible tube extending from the vacuum container and communicating with the evacuation port. The container is evacuated via the rigid tube which is then withdrawn from the flexible tube with an attendant collapse of the unsupported portion of the flexible tube. The flexible tube is temporarily clamped while a permanent seal is made adjacent the free end of the flexible tube permitting reuse of the tube for evacuating by cutting off the permanently sealed end portion thereof.

---

The invention described herein may be manufactured and used by or for the Government of the United States of America for governmental purposes without the payment of any royalties thereon or therefor.

This invention relates to the sealing of the evacuation port of a vacuum container, such as a flexible vacuum jacket for space flight use, and more particularly to a method of and means for effecting such sealing.

The invention is particularly concerned with the provision of an improved mode of sealing an evacuation port of a flexible vacuum jacket such as used in space flight, although it may be useful in connection with the sealing of evacuation ports of other vacuum containers. Heretofore sealing of such an evacuation port has been accomplished by use of a metal evacuation tube extending from the jacket, the metal tube being sealed after evacuation of the jacket by a valve or by welding, brazing or soldering the tube. These prior art modes of sealing the evacuation port have not been wholly satisfactory, particularly as regards space flight vacuum jackets, due to excessive weight of the metal tube (and valve, if used), requirements for additional structural supports under high loads, and the possibility of damaging adjacent parts in carrying out the welding, brazing or soldering operation.

Accordingly, among the several objects of the invention may be noted the provision of an improved mode of sealing an evacuation port of a vacuum container, and particularly a flexible vacuum jacket such as used in space flight, which involves little weight, which is self-supporting under high loads, and which avoids any necessity for operations such as welding, brazing or soldering which might damage the jacket; the provision of a mode of sealing which is of such low weight that it is possible to have a plurality of evacuation ports for a jacket adapted for simultaneous evacuation to reduce the time required for evacuating the jacket; the provision of a mode of sealing which is such that the seal may be broken when desired and the jacket re-evacuated and re-sealed a number of times; and the provision of a mode of sealing which is inexpensive and easy to carry out. Other objects and features will be in part apparent and in part pointed out hereinafter.

The invention accordingly comprises the constructions and methods hereinafter described, the scope of the invention being indicated in the following claim.

In the accompanying drawings, in which one of various possible embodiments of the invention is illustrated, FIG. 1 is a view in section of a portion of a vacuum container, e.g., a flexible vacuum jacket, provided with a flexible tube for effecting evacuation of the container in accordance with this invention;

Corresponding reference characters indicate corresponding parts throughout the several views of the drawings.

Figure 1:
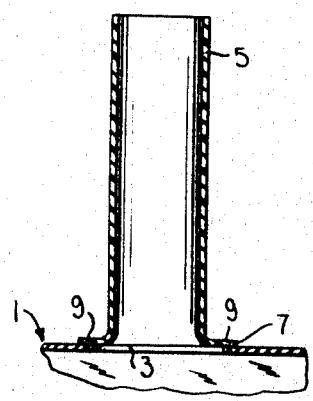

Referring to the drawings, first more particularly to FIG. 1, there is indicated at 1 a vacuum container which may be a flexible vacuum jacket such as used in space flight. This has an evacuation port 3 through which it may be evacuated. In accordance with this invention, the container 1 is provided with a relatively thin-walled flexible tube 5 extending outward therefrom in communication with the port 3. The tube 5 may be a thin gauge flexible plastic tube (for example, a thin gauge flexible polyethylene tube), or it may be made of a thin gauge flexible plastic/metal laminate (e.g., an aluminum foil and polyethylene laminate). One end of the flexible tube is flanged out as indicated at 7 and sealed to the container around the port 3 as indicated at 9.

Figure 2:
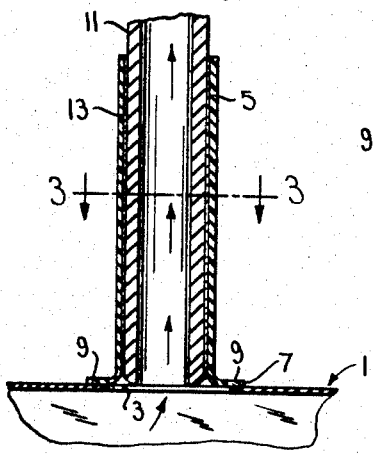
FIG. 2 is a section similar to FIG. 1 showing a rigid evacuation member inserted in the flexible tube.
Figure 3:
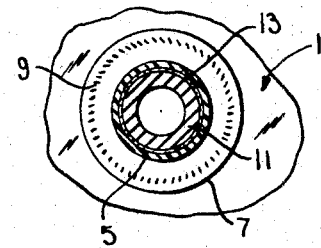
FIG. 3 is a transverse section taken on line 3—3 of FIG. 2.

At 11 is indicated a rigid evacuation member, shown as constituted by a metal tube, adapted for a tight telescopic fit in the flexible tube 5. This rigid evacuation tube is connected to the inlet of a vacuum pump (not shown). As shown in FIG. 2, the rigid evacuation tube 11 is inserted in the flexible tube 5 to the point where the inserted end of the rigid tube is adjacent the inner end of the flexible tube so as to prevent collapse of the flexible tube upon evacuation of the container 1 via the evacuation tube, the rigid tube being in sealed relation to the surrounding flexible tube.

FIG. 2 shows the rigid tube inserted to the point where its inserted end projects slightly from the inner end of the flexible tube, and it will be understood that it may be inserted somewhat more or less, as long as it is inserted far enough to function as a support preventing collapse of the flexible tube upon itself. Preferably, a suitable vacuum lubricant of any well-known constituency is applied between the tubes as indicated at 13. This may be carried out by coating the inside of the flexible tube with lubricant prior to insertion of the rigid tube to assure complete coating of the inside of the flexible tube, or it may be possible to carry this out by coating the rigid tube with lubricant prior to inserting it in the flexible tube.

Figure 4:
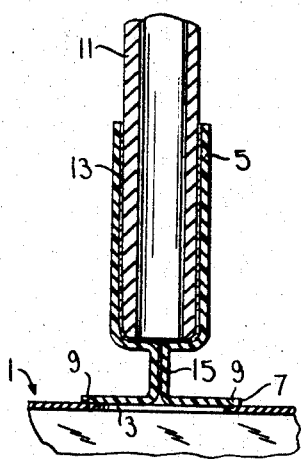
FIG. 4 is a section similar to FIG. 2 showing the evacuation member partially withdrawn.
Figure 5:
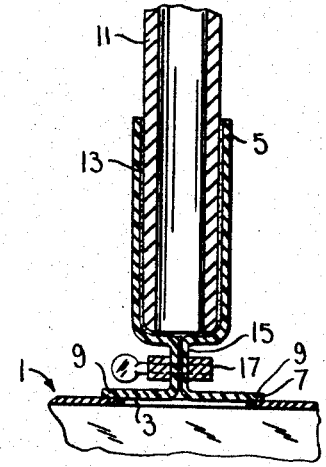
FIG. 5 is a section similar to FIG. 4 showing a clamp applied.

With the rigid evacuation tube 11 inserted and sealed in the flexible tube 5 as shown in FIG. 2, the container 1 is evacuated via the tube 11. When the desired degree of vacuum is attained in the container, the flexible tube 5 is slowly slipped off the rigid tube 11 partially to withdraw the rigid tube from the flexible tube. The unsupported portion of the flexible tube between the container 1 and the inserted end of the rigid tube 11 collapses flat upon itself under ambient atmospheric pressure as indicated at 15 in FIG. 4. A clamp 17 of any suitable type is then applied to the collapsed portion 15 of the flexible tube as shown in FIG. 5 to prevent loss of vacuum in the container, and the withdrawal of the rigid tube is completed.

Figure 6:
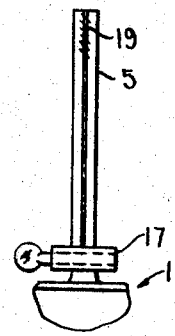
FIG. 6 is a section similar to FIG. 5 showing the evacuation member withdrawn after application of the clamp, and showing a seal at the outer end of the flexible tube.
Figure 7:
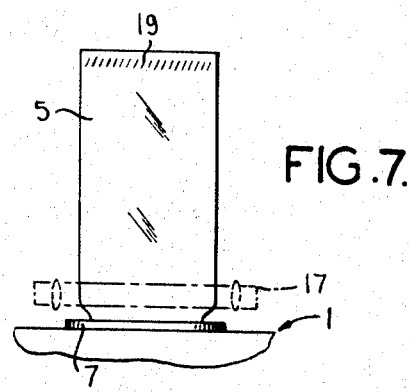
FIG. 7 is a side elevation of FIG. 6, showing the clamp in phantom.

The flexible tube remains tightly sealed by the clamp to prevent loss of vacuum in the container, the vacuum lubricant 13 acting as a sealant to insure tight sealing, while the flexible tube is permanently sealed at least at one region along its length outward of the clamp as indicated at 19 in FIGS. 6 and 7, whereupon the clamp may be removed. The seal at 19 may be a heat seal, for example, or any other suitable type, including an adhesive seal, or an ultrasonic seal, or a mechanical type of seal. Seals may be made at several places along the length of the flexible tube if necessary. By making the flexible tube 5 relatively long and locating the permanent seal or seals toward the outer end of the flexible tube, the sealed portion of the latter may be cut off for repetitive re-use.

In view of the above, it will be seen that the several objects of the invention are achieved and other advantageous results attained.

What is claimed is:

1. The method of evacuating a vacuum container having an evacuation port and a relatively thin-walled flexible tube extending from the container in communication with the evacuation port, comprising:
   (a) applying a vacuum lubricant coating to the external surface of a rigid evacuation tube;
   (b) inserting said rigid evacuation tube into said flexible tube to the point where the inserted end of said rigid exacuation tube is adjacent the inner end of said flexible tube so as to prevent collapse of said flexible tube upon evacuation of said container via said rigid evacuation tube;
   (c) evacuating said container via said rigid evacuation tube;
   (d) partially withdrawing said rigid evacuation tube from said flexible tube with attendant collapse upon itself of the unsupported portion of said flexible tube between said container and the inserted end of said rigid evacuation tube under ambient pressure;
   (e) applying a clamp to the collapsed portion of said flexible tube to prevent loss of vacuum in said container;
   (f) completing the withdrawal of said rigid evacuation tube from said flexible tube;
   (g) permanently sealing said flexible tube adjacent the end thereof opposite said evacuation port while leaving a length of said flexible tube between said permanent seal and said point sealed only by said vacuum lubricant whereby said permanently sealed portion of said flexible tube may be subsequently cut off and said length re-used for evacuation and sealing of said container;
   (h) removing said clamp from said flexible tube.

References Cited

UNITED STATES PATENTS 1,970,193   8/1934   Riebel.

JAMES B. MARBERT, *Primary Examiner.*